(12) United States Patent
Chuang et al.

(10) Patent No.: US 9,007,694 B2
(45) Date of Patent: Apr. 14, 2015

(54) DISPLAY APPARATUS

(71) Applicants: Fu-Ming Chuang, Hsin-Chu (TW);
Chih-Chieh Yu, Hsin-Chu (TW);
Chih-Meng Wu, Hsin-Chu (TW)

(72) Inventors: Fu-Ming Chuang, Hsin-Chu (TW);
Chih-Chieh Yu, Hsin-Chu (TW);
Chih-Meng Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/200,018

(22) Filed: Mar. 7, 2014

(65) Prior Publication Data
US 2014/0254023 A1    Sep. 11, 2014

(30) Foreign Application Priority Data
Mar. 7, 2013  (TW) .............................. 102204218 U

(51) Int. Cl.
*G02B 27/12* (2006.01)
*G02B 27/01* (2006.01)
*G02B 5/30* (2006.01)

(52) U.S. Cl.
CPC .............. *G02B 27/0101* (2013.01); *G02B 5/30* (2013.01)

(58) Field of Classification Search
CPC .............. G02B 17/06; G02B 19/0028; G02B 19/0047; G02B 26/008; G02B 27/0994; G02B 6/0006; G02B 6/10; G02B 27/145; G02B 5/0284; G02B 27/102; G02B 27/1026; G02B 27/1046; G02B 27/143; G02B 27/283
USPC .......................... 359/619–633, 533, 548, 549
See application file for complete search history.

(56) References Cited

U.S. PATENT DOCUMENTS

| | | | |
|---|---|---|---|
| 3,475,087 A * | 10/1969 | Busch | ............................ 352/104 |
| 4,973,139 A | 11/1990 | Weinhrauch et al. | |
| 6,989,934 B2 | 1/2006 | Aoki et al. | |
| 7,982,600 B2 | 7/2011 | Gavrila et al. | |
| 8,047,660 B2 * | 11/2011 | Penn et al. | ..................... 353/102 |
| 8,212,662 B2 * | 7/2012 | Sasaki et al. | ................... 340/438 |
| 2008/0082232 A1 | 4/2008 | Repetto et al. | |
| 2010/0157430 A1 | 6/2010 | Hotta et al. | |

FOREIGN PATENT DOCUMENTS

| | | |
|---|---|---|
| TW | 201219828 | 5/2012 |
| TW | 201245764 | 11/2012 |

OTHER PUBLICATIONS

"Office Action of Taiwan Counterpart Application", issued on Nov. 11, 2014, p. 1-p. 2.

* cited by examiner

*Primary Examiner* — Joseph P Martinez
*Assistant Examiner* — Brandi Thomas
(74) *Attorney, Agent, or Firm* — Jianq Chyun IP Office

(57) ABSTRACT

A display apparatus including a display unit, a first reflector, a second reflector, a third reflector and a lens unit is provided. The display unit emits an image beam. The first reflector is disposed on a transmission path of the image beam. The second reflector is disposed on the transmission path of the image beam from the first reflector. The third reflector is disposed on the transmission path of the image beam from the second reflector. The lens unit is disposed on the transmission path of the image beam from the third reflector. The image beam emitted from the display unit passes through a space defined between the second reflector and the third reflector and is transmitted to the first reflector. Afterward, the image beam is sequentially reflected by the first reflector, the second reflector and the third reflector, and then passes through the lens unit.

10 Claims, 6 Drawing Sheets

DISPLAY APPARATUS

CROSS-REFERENCE TO RELATED APPLICATION

This application claims the priority benefit of Taiwan application serial no. 102204218, filed on Mar. 7, 2013. The entirety of the above-mentioned patent application is hereby incorporated by reference herein and made a part of this specification.

BACKGROUND OF THE INVENTION

1. Field of the Invention

The invention relates to a display apparatus, and more particularly, to a display apparatus having a favorable image quality.

2. Description of Related Art

With yearly rising demands of electronic components used in transportation means, various display apparatuses used in the transportation means have been successively developed. A traditional display apparatus is commonly installed on a dashboard of a vehicle. However, traffic safety concerns are likely to be caused when a driver bows to look at the display apparatus installed on the dashboard. Therefore, a display apparatus capable of projecting an image onto a windshield, such as a head up display (HUD), has already been widely used.

In conventional technology, image displayed by the display apparatus (e.g., the head up display and etc.) has a position mostly nearby the windshield above the dashboard. When a user wants to see the images displayed by the display apparatus during the driving process, the user needs to diver focuses of the eyes from a distance ahead of the windshield to an image position nearby the windshield. Now, if the attention of the user is unable to continuously focus at road conditions at the distance ahead of the windshield, then it may easily lead to traffic accidents. Moreover, in the conventional technology, the display apparatus, due to an internal optical configuration thereof, causes the displayed image to be prone to distortion and causes the displayed image unclear to be seen; and therefore, according to the above, how to develop a display apparatus not easily leading to the traffic accidents and enabling the imaging of the display apparatus to have a favorable quality is, in fact, one of the goals for those skilled in the art.

In addition, U.S. Pat. No. 4,973,139 has disclosed a head up display. US Patent Publication No. 2008/0082232 has disclosed a vehicular head up display system. US Patent Publication No. 2010/0157430 has disclosed a vehicle display system. U.S. Pat. No. 6,989,934 has disclosed a vehicular head up display installed on a dashboard. U.S. Pat. No. 7,982,600 has disclosed a vehicle display system.

SUMMARY OF THE INVENTION

In an embodiment of the invention, a display apparatus capable of increasing an image distance of an image and having a favorable image quality is provided. If this display apparatus is applied to a transportation means, a probability of occurrence of traffic accidents may be reduced.

The display apparatus of an embodiment of the invention includes a display unit, a first reflector, a second reflector, a third reflector and a lens unit. The display unit emits an image beam. The first reflector is disposed on a transmission path of the image beam. The second reflector is disposed on the transmission path of the image beam from the first reflector. The third reflector is disposed on the transmission path of the image beam from the second reflector. The lens unit is disposed on the transmission path of the image beam from the third reflector. The image beam emitted from the display unit passes through a space defined between the second reflector and the third reflector and is transmitted to the first reflector. Afterward, the image beam is sequentially reflected by the first reflector, the second reflector and the third reflector, and then passes through the lens unit.

In the embodiment of the invention, the lens unit comprises a convex lens.

In the embodiment of the invention, the lens unit has a light incident surface and a light emitting surface. The light incident surface and the light emitting surface are respectively located at two opposite sides of the lens unit. The light incident surface faces toward the third reflector. One of the light incident surface and the light emitting surface is a Fresnel lens surface, and the other one of the light incident surface and the light emitting surface is a diffractive optical element surface.

In the embodiment of the invention, an object distance from a display surface of the display unit, after being through the first reflector, the second reflector and the third reflector, to the lens unit is smaller than a focal length of the lens unit.

In the embodiment of the invention, the display apparatus is configured to be disposed below a windshield of a transportation means, wherein an optical axis of the lens unit is inclined with respect to the windshield, and at least a portion of the image beam is reflected by the windshield after the image beam passing through the lens unit is obliquely incident on the windshield.

In the embodiment of the invention, the windshield reflects the at least a portion of the image beam to eyes of a user sitting on a driver seat of the transportation means, so that the user sees a virtual image of the display unit. And a distance between the virtual image and the eyes of the user fall within a range from greater than or equal to 1 meter to smaller than or equal to 30 meters. The windshield has an inner surface facing towards the driver seat. An incident angle of the image beam incident on the inner surface of the windshield is greater than a Brewster's angle.

In the embodiment of the invention, the third reflector connects the display unit and the first reflector, the first reflector connects the third reflector and the lens unit, the lens unit connects the first reflector and the second reflector, and the second reflector connects the lens unit and the display unit.

In the embodiment of the invention, the first reflector, the second reflector and the third reflector respectively have a flat reflecting surface.

According to the foregoing, in the embodiment of the display apparatus of the invention, the image beam emitted from the display unit is reflected by a plurality of reflectors and then is transmitted to the lens unit to foil an image. Therefore, the object distance of the display surface of the display unit may be lengthened, such that the image distance of the display surface may be increased. As a result, the user may simultaneously pay attention to the road conditions and an image displayed by the display unit at a distance ahead of the windshield of the transportation means, so that the user may safely drive and comfortably uses the display apparatus described in the embodiments the invention.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
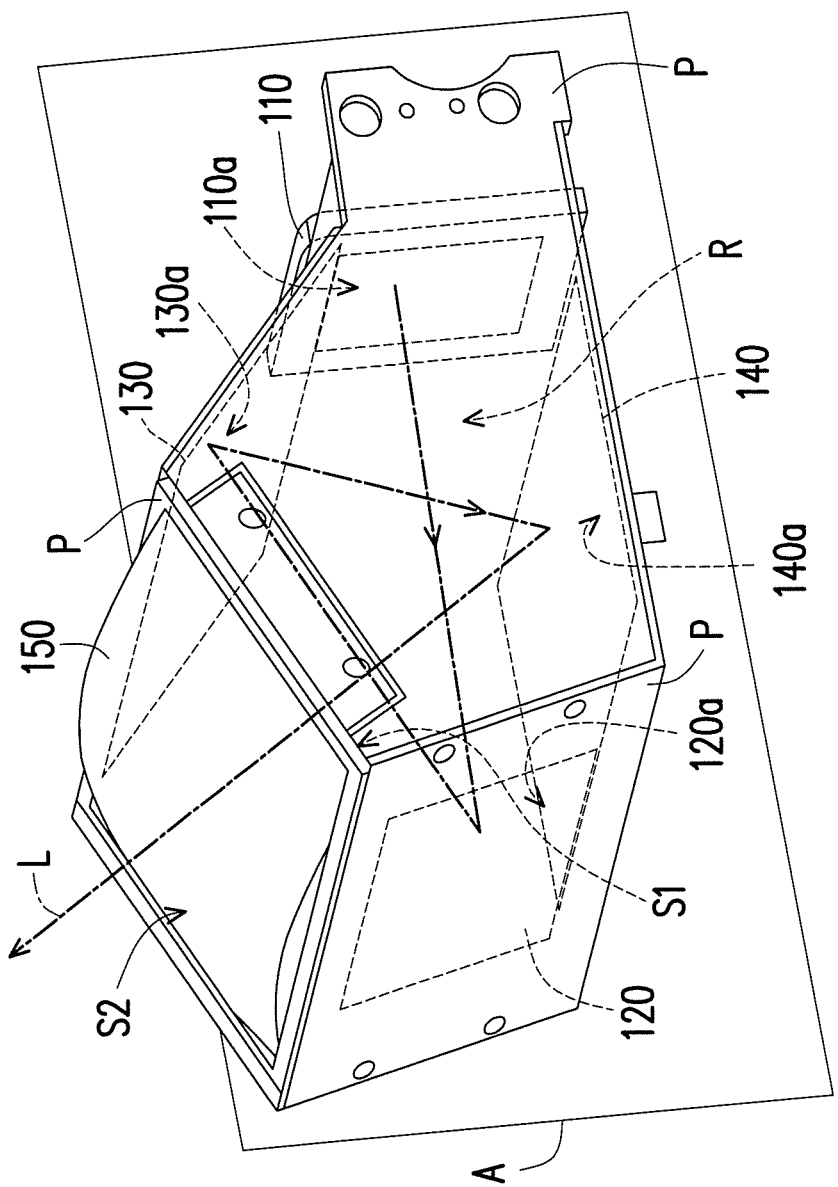
FIG. 1 is a perspective schematic diagram illustrating a display apparatus according to an embodiment of the invention.
Figure 2:
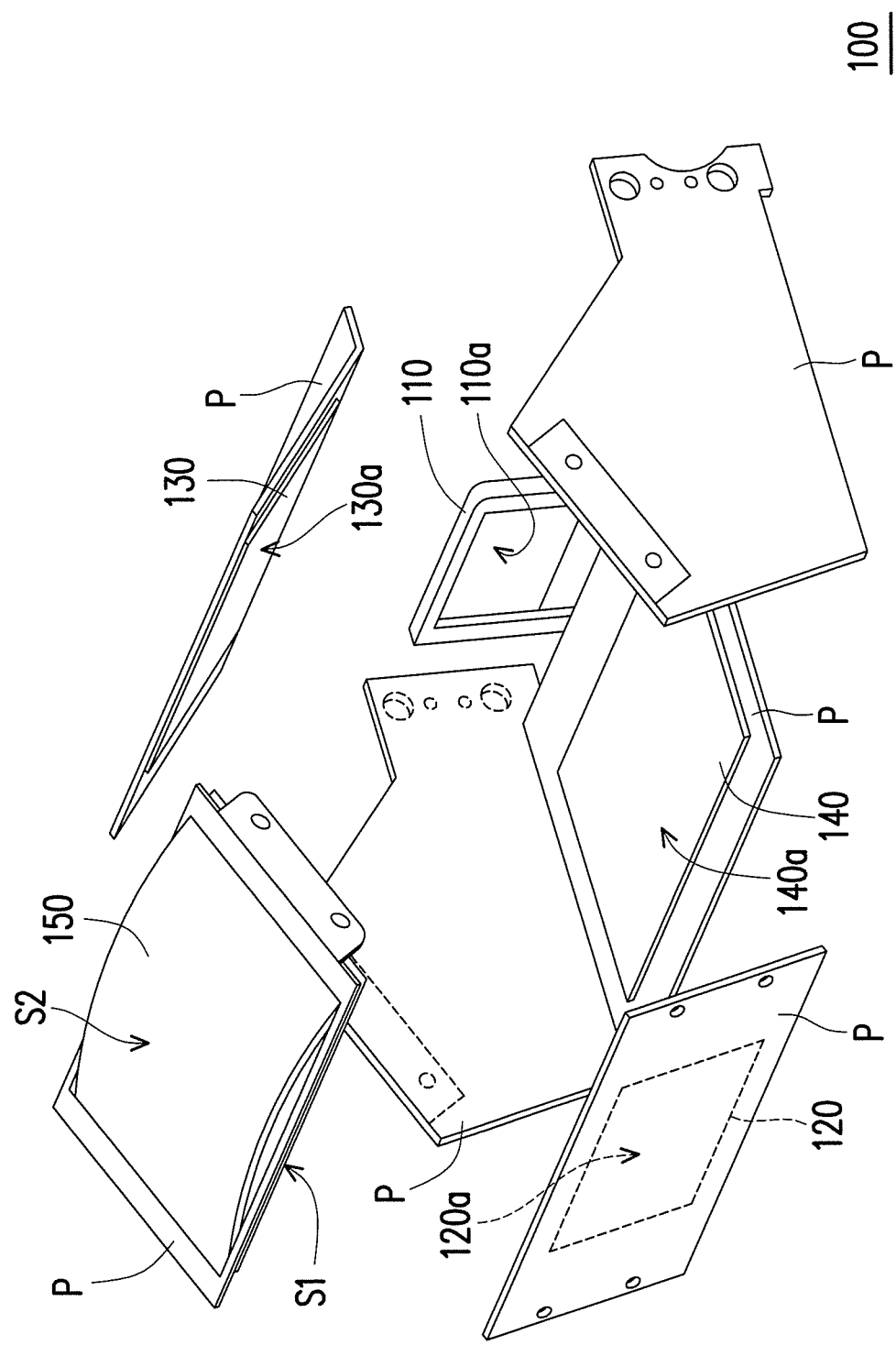
FIG. 2 is an exploded diagram of the display apparatus of FIG. 1.
Figure 3:
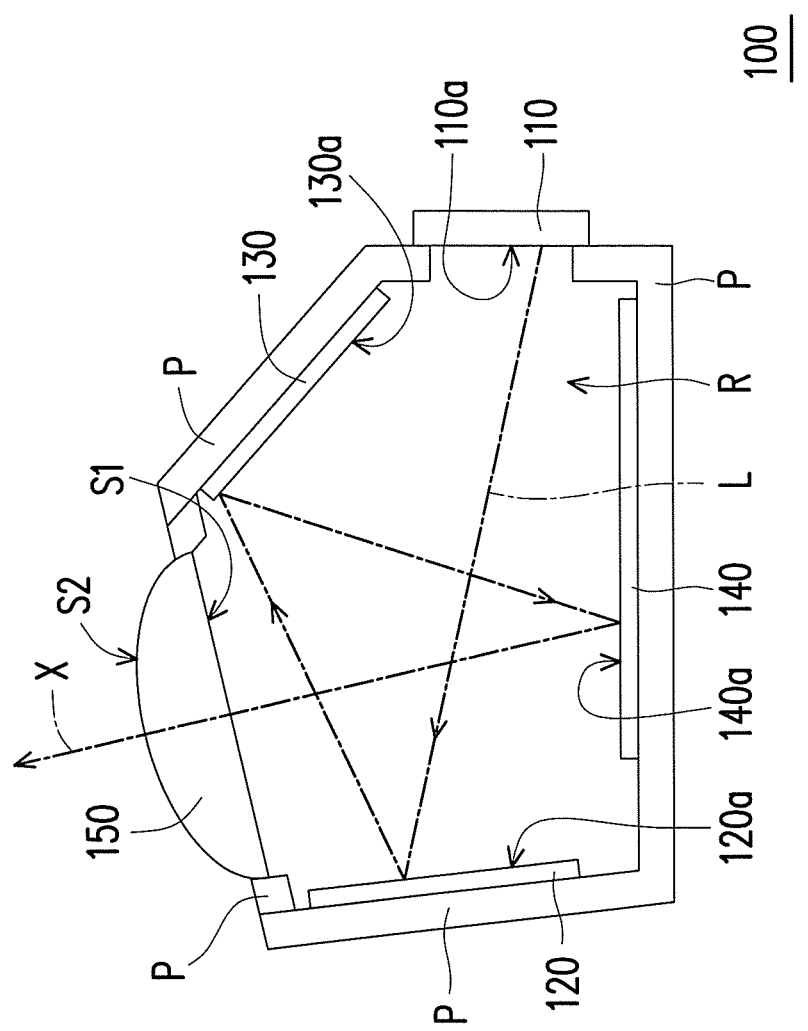
FIG. 3 is a cross-sectional diagram corresponding to a cross-section A of FIG. 1.

FIG. 1 is a perspective schematic diagram illustrating a display apparatus according to an embodiment of the invention. FIG. 2 is an exploded view of the display apparatus in FIG. 1. FIG. 3 is a cross-sectional diagram corresponding to a cross-section A of FIG. 1. Referring to FIG. 1, FIG. 2 and FIG. 3, a display apparatus 100 of this embodiment includes a display unit 110, a first reflector 120, a second reflector 130, a third reflector 140 and a lens unit 150.

The display unit 110 emits an image beam L. The image beam L refers to a light beam carrying image information. In this embodiment, the display unit 110 may be a flat panel display, such as a liquid crystal display panel, a light emitting diode display panel, an organic light emitting diode display panel and so forth, but the invention is not limited thereto. The first reflector 120, the second reflector 130 and the third reflector 140 respectively have a flat reflecting surface, and the first reflector 120, the second reflector 130 and the third reflector 140 may be plane mirrors having the reflecting surfaces that facing towards the interior of the display apparatus 100, but the invention is not limited thereto. The lens unit 150A has a light incident surface S1 and a light emitting surface S2 respectively located at two opposite side thereof. The lens unit 150 may be a convex lens, such as a plano-convex lens, a biconvex lens and so forth, but the invention is not limited thereto; and in other embodiment, the lens unit may also be of other form. In the following below, FIG. 4 is taken as an example to provide more details.

Figure 4:
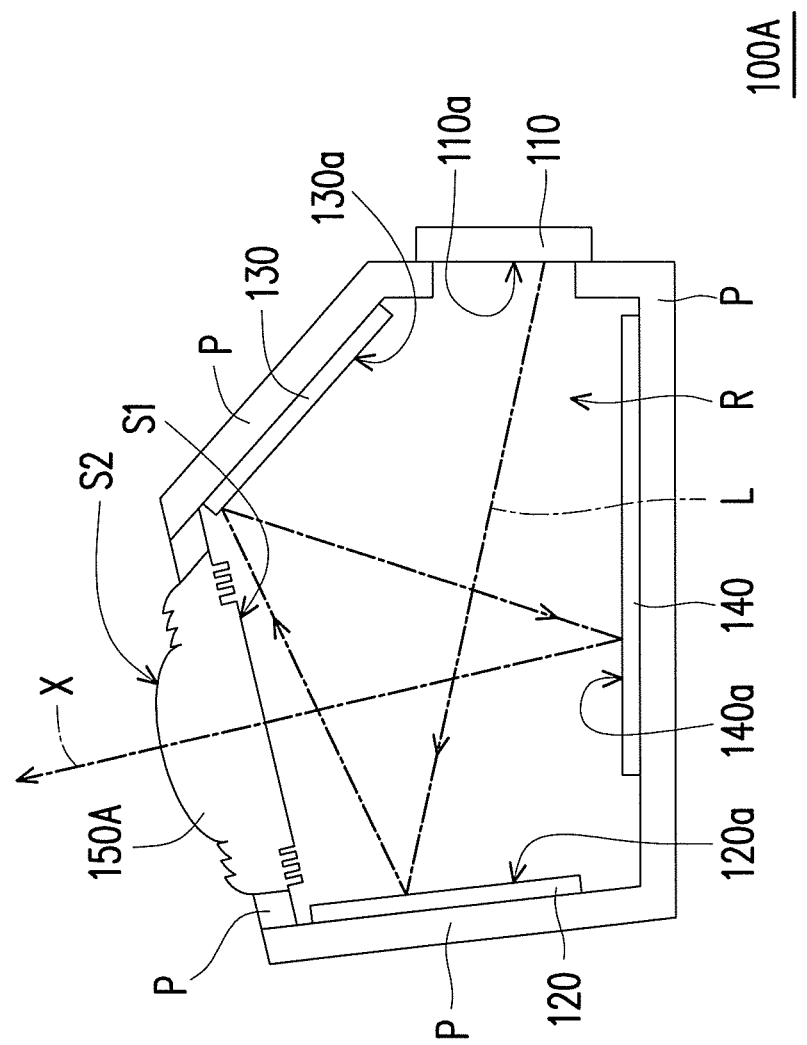
FIG. 4 is a cross-sectional schematic diagram illustrating a display apparatus according to another embodiment of the invention.

FIG. 4 is a cross-sectional schematic diagram illustrating a display apparatus according to another embodiment of the invention. A display apparatus 100A of FIG. 4 is similar to the display apparatus 100 of FIG. 3, and thus the same or corresponding elements are represented by the same or corresponding reference labels. Referring to FIG. 4, in the display apparatus 100A, a lens unit 150A has a light incident surface S1 and a light emitting surface S2. The light incident surface S1 and the light emitting surface S2 are respectively located at two opposite side of the lens unit 150A, and the light incident surface S1 faces toward the third reflector 140. One of the light incident surface S1 and the light emitting surface S2 may be a Fresnel lens surface, and the other one of the light incident surface S1 and the light emitting surface S2 may be a diffractive optical element (DOE) surface. In this embodiment, the light emitting surface S2 is a Fresnel lens surface and the light incident surface S1 is a diffractive optical element surface, but the invention is not limited thereto. Since one of the light incident surface S1 and the light emitting surface S2 of the lens unit 150A is the Fresnel lens surface, a volume of the lens unit 150A may be reduced. Since the other one of the light incident surface S1 and the light emitting surface S2 of the lens unit 150A is the diffractive optical element surface, an achromatic ability of the lens unit 150A is favorable.

Referring to FIG. 1, FIG. 2 and FIG. 3 again, from a point of view of a transmission path of the image beam L, the first reflector 120 is disposed on a transmission path of the image beam L emitted from the display unit 110. The second reflector 130 is disposed on the transmission path of the image beam L from the first reflector 120. The third reflector 140 is disposed on the transmission path of the image beam L from the second reflector 130. The lens unit 150 is disposed on the transmission path of the image beam L from the third reflector 140. The image beam L emitted from the display unit 110 firstly passes through a space R defined between the second reflector 130 and the third reflector 140 and incidents on the first reflector 120. And following that, the image beam L is sequentially reflected by the first reflector 120, the second reflector 130 and the third reflector 140, and then passes through the lens unit 150.

From a point of view of space configuration, in this embodiment, the third reflector 140 connects the display unit 110 and the first reflector 120. The first reflector 120 connects the third reflector 140 and the lens unit 150. The lens unit 150 connects the first reflector 120 and the second reflector 130. The second reflector 130 connects the lens unit 150 and the display unit 110. The display unit 110 connects the second reflector 130 and the third reflector 140. Furthermore, a display surface 110a of the display unit 110 may face towards a reflecting surface 120a of the first reflector 120, and the reflecting surface 120a of the first reflector 120 may be inclined with respect to a reflecting surface 140a of the third reflector 140 in a direction away form the display unit 110. A reflecting surface 130a of the second reflector 130 may be inclined with respect to the reflecting surface 140a of the third reflector 140 in a direction away from the display unit 110 and the third reflector 140.

Specifically, the first reflector 120, the second reflector 130, the third reflector 140 and the lens unit 150 are respectively fixed on a plurality of plate members P surroundingly forming a housing (not numbered) of the display apparatus 100, and the reflecting surface 120a of the first reflector 120, the reflecting surface 130a of the second reflector 130 and the reflecting surface 140a of the third reflector 140 all face toward the interior of the housing of the display apparatus 100 so as to be configured into the aforesaid form. However, the invention is not limited thereto; in other embodiment, the first reflector 120, the second reflector 130 and the third reflector 140 may be respectively formed on a plurality of surfaces of a transparent solid body, and the lens unit 150 may be integratedly formed by using materials of the transparent solid body.

Figure 5:
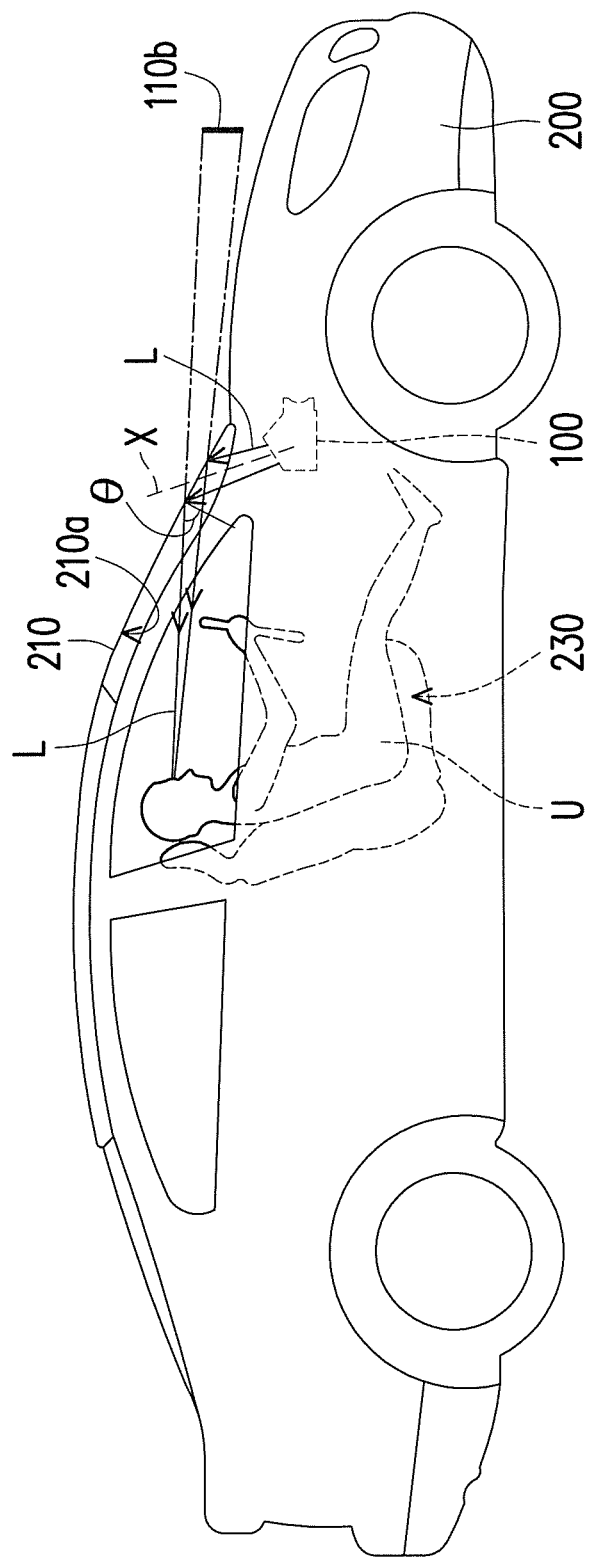
FIG. 5 illustrates a condition of applying the display apparatus to transportation means according to an embodiment of the invention.

FIG. 5 illustrates a condition of applying the display apparatus to transportation means according to an embodiment of the invention. Referring to FIG. 5, the display apparatus 100 of this embodiment may be disposed below a windshield 210 of transportation means 200. In FIG. 5, the transportation means, for an example, is a car. However, the invention is not limited thereto; in other embodiment, the display apparatus 100 may also be disposed in other types of transportation means, such as trains, airplane, ships and so forth.

Referring to FIG. 3, in this embodiment, since an object distance from the display surface 110a of the display unit 110, after being through the first reflector 120, the second reflector 130 and the third reflector 140, to the lens unit 150 may be smaller than a focal length of the lens unit 150, a virtual image of a displayed image on the display surface 110a of the display unit 110 may be formed. Referring to FIG. 5, since an optical axis X of the lens unit 100 is inclined with respect to the windshield 210, at least a portion of the image beam L may be reflected by the windshield 210 to eyes of a user U sitting on a driver seat 230 of the transportation means 200 after the image beam L is obliquely incident on the windshield 210, such that the virtual image 110b is at a distance from the user U and the user U sees the virtual image 110b with the image information generated by the display unit 100.

Noteworthily, the image beam L emitted from the display unit 110 is reflected by the first reflector 120, the second reflector 130 and the third reflector 140 in sequence, and thereby transmitted to the lens unit 150. Therefore, the object distance of the display surface 110a of the display unit 110 may be lengthened, such that an image distance of the virtual image of the display surface 110a may be increased. As a result, after the image beam L is reflected by the windshield 210, the user U may simultaneously see road conditions and the image information displayed by the display unit 110 at a distance ahead of the windshield 210, and the user U does not need to switch focuses of the eyes to nearby the windshield 210 when wanting to see the image information displayed by the display unit 110. Therefore, the driving safety is enhanced. In this embodiment, the distance between the virtual image 110b and the eyes of the user U may fall within a range from greater than or equal to 1 meter to smaller than or equal to 30 meters. In addition, since the display apparatus 100 of this embodiment forms the virtual image via the lens unit 150 instead of a conventional curved reflective surface, the display apparatus 100 of this embodiment may have a favorable effect in a distortion control of the displayed image.

Figure 6:
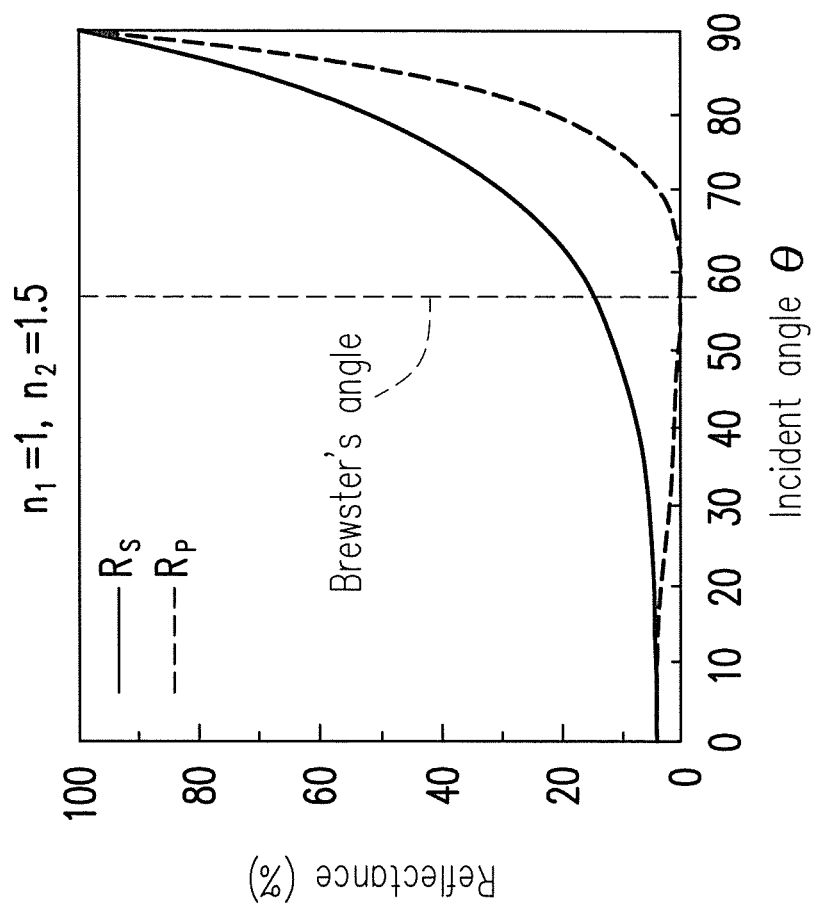
FIG. 6 illustrates a relationship between an incident angle and a reflectance of an image beam transmitted by air to an inner surface of a windshield.

As shown in FIG. 5, in this embodiment, the windshield 210 has an inner surface 210a facing towards the driver seat 230, an incident angle θ of the image beam L from the display apparatus 100 incident on the inner surface 210a of the windshield 210 may be greater than a Brewster's angle. FIG. 6 illustrates a relationship between an incident angle and a reflectance of an image beam transmitted by air to an inner surface of a windshield. The image beam L may be categorized as S polarized beam Rs and P polarized beam Rp. As shown in FIGS. 5-6, when the incident angle θ of the image beam L incident on the inner surface 210a of the windshield 210 is approximately greater than the Brewster's angle, such as 60 degrees (assuming that a refractive index of air $n_1$ is 1, a refractive index of the windshield 210 $n_2$ is 1.5), a reflectance of the S polarized beam Rs is approximately 20%. In other words, even if under a condition that the windshield 210 has no special coating, through appropriate optical design, the reflectance refractivity of the S polarized beam Rs of the image beam L may be at least 20%, so that the user U may clearly see the image information displayed by the virtual image 110b when simultaneously observing the external environment, and thereby enhance the driving safety.

In summary, in the embodiments of the display apparatus of the invention, the image beam emitted by the display unit is transmitted to the lens unit to form an image after being reflected by the reflectors. Therefore, the object distance of the display surface of the display unit may be lengthened, such that the image distance of the display surface may be increased. As a result, after the reflection of the windshield, the user may simultaneously see the road conditions and the image information displayed by the display unit at a distance ahead of the windshield, and the user does not need to divert the attention to nearby the windshield when observing the image information displayed by the display unit and to affect the traffic safety. In addition, since the display apparatus forms the image via the lens unit instead of the conventional curved reflective surface, the display apparatus may have a favorable effect in the distortion control of the displayed image, and thereby the display apparatus may have a favorable image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Moreover, in the specification, the teens "first", "second", etc. are only used for representing the elements or differentiating the various embodiments or scopes, but are not intended to limit the upper bound and the lower bound of the quantities of the elements.

What is claimed is:

1. A display apparatus comprising:
   a display unit emitting an image beam;
   a first reflector disposed on a transmission path of the image beam;
   a second reflector disposed on the transmission path of the image beam from the first reflector;
   a third reflector disposed on the transmission path of the image beam from the second reflector; and
   a lens unit disposed on the transmission path of the image beam from the third reflector, wherein the image beam emitted from the display unit firstly passes through a space defined between the second reflector and the third reflector and is transmitted to the first reflector, and the image beam is sequentially reflected by the first reflector, the second reflector and the third reflector, the image beam reflected by the third reflector passes through a space between the first reflector and the second reflector and then passes through the lens unit, wherein the lens unit connects the first reflector and the second reflector.

2. The display apparatus as recited in claim 1, wherein the lens unit comprises a convex lens.

3. The display apparatus as recited in claim 1, wherein the lens unit has a light incident surface and a light emitting surface, the light incident surface and the light emitting surface are respectively located at two opposite sides of the lens unit, the light incident surface faces toward the third reflector, one of the light incident surface and the light emitting surface is a Fresnel lens surface, and the other one of the light incident surface and the light emitting surface is a diffractive optical element surface.

4. The display apparatus as recited in claim 1, wherein an object distance from a display surface of the display unit, after being through the first reflector, the second reflector and the third reflector, to the lens unit is smaller than a focal length of the lens unit.

5. The display apparatus as recited in claim 1, configured to be disposed below a windshield of a transportation means, wherein an optical axis of the lens unit is inclined with respect to the windshield, and at least a portion of the image beam is reflected by the windshield after the image beam passing through the lens unit is obliquely incident on the windshield.

6. The display apparatus as recited in claim 5, wherein the windshield reflects the at least a portion of the image beam to eyes of a user sitting on a driver seat of the transportation means, so that the user sees a virtual image of the display unit.

7. The display apparatus as recited in claim 6, wherein a distance between the virtual image and the eyes of the user fall within a range from greater than or equal to 1 meter to smaller than or equal to 30 meters.

8. The display apparatus as recited in claim 6, wherein the windshield has an inner surface facing towards the driver seat, and an incident angle of the image beam incident on the inner surface of the windshield is greater than a Brewster's angle of the windshield, wherein the Brewster's angle of the windshield ranges from 55.4° to 62.36°.

9. The display apparatus as recited in claim 1, wherein the third reflector connects the display unit and the first reflector, the first reflector connects the third reflector and the lens unit, and the second reflector connects the lens unit and the display unit.

10. The display apparatus as recited in claim 1, wherein the first reflector, the second reflector and the third reflector respectively have a flat reflecting surface.

* * * * *